UNITED STATES PATENT OFFICE.

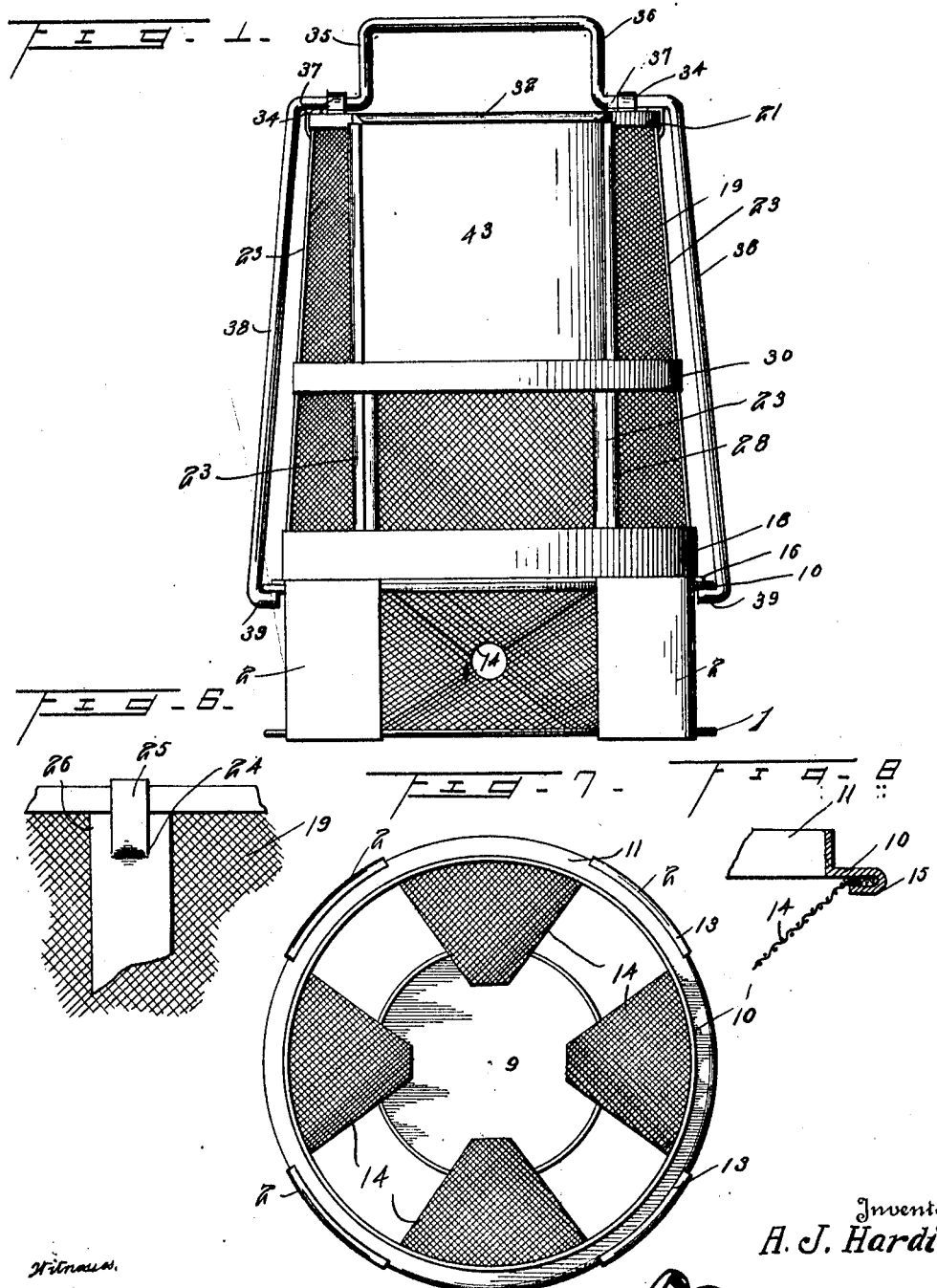

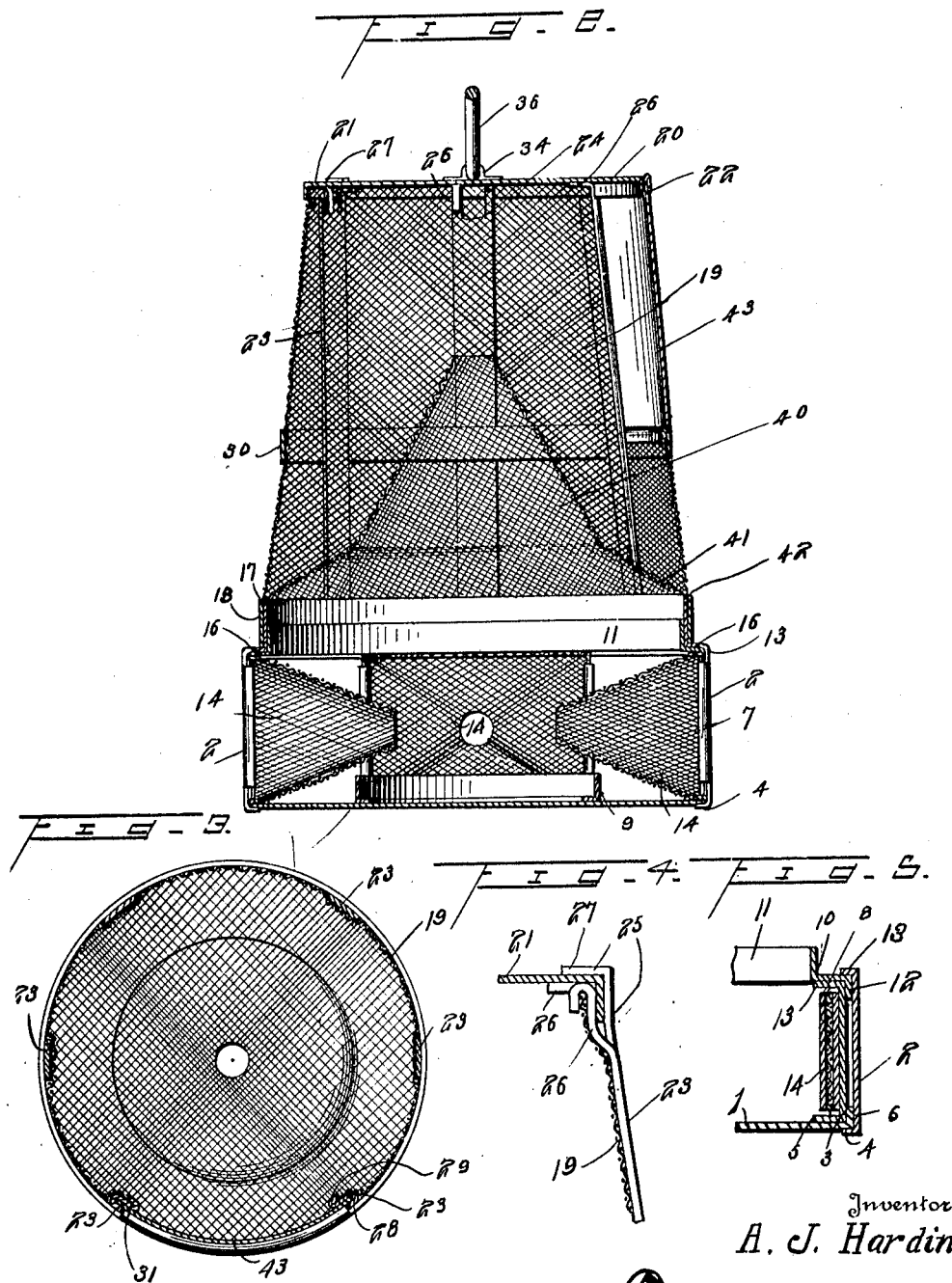

ANDREW J. HARDIN, OF CHATTAHOOCHEE, FLORIDA.

INSECT-TRAP.

1,313,986.   Specification of Letters Patent.   Patented Aug. 26, 1919.

Application filed December 9, 1916. Serial No. 135,986.

*To all whom it may concern:*

Be it known that I, ANDREW J. HARDIN, a citizen of the United States, residing at Chattahoochee, in the county of Gadsden and State of Florida, have invented certain new and useful Improvements in Insect-Traps; and I do hereby declare the following to be a full, clear, and exact description of the invention, such as will enable others skilled in the art to which it appertains to make and use the same.

This invention relates to improvements in insect traps.

The object of the invention resides in the provision of an insect trap particularly adapted for catching roaches, water bugs, and other crawling insects.

A further object of this invention is the provision of a trap which may be readily baited and placed in the yard, in the field, in the stable, upon the sidewalks, in the house, or elswhere, and one that is durable and strong and capable in every way of withstanding the use and abuse when placed out of doors.

A still further object of this invention is to provide an insect trap which comprises an upper and lower receptacle which are constructed of sheet metal and a foraminous body of cylindrical form, and one that prevents the insects from escaping once in the trap.

Still another object of this invention is the provision of an insect trap of this character which will be simple, practical, and comparatively inexpensive, and one that can be manufactured and sold at a low cost.

With these and other objects in view, the invention consists in the novel combination and arrangement of parts, hereinafter more fully described and set forth in the claims hereto appended.

In the drawings,

Figure 1 is a view in elevation showing the trap made in accordance with this invention and in an assembled position, Fig. 2 is a vertical sectional view of the same, Fig. 3 is a horizontal sectional view taken through the top part of the trap, Fig. 4 is a detail sectional view illustrating the manner in which the protecting rods are secured in the top member of the trap, Fig. 5 is a detail sectional view showing the manner in which the lower part of the trap is assembled, Fig. 6 is a detail view illustrating the manner in which the upper ends of the rods are connected to the top of the trap, Fig. 7 is a top plan view of the bottom part of the trap with the top removed, and Fig. 8 is a detail sectional view of the manner in which the supporting ring is secured.

Like numerals of reference designate corresponding parts in all the figures of the drawings.

Referring more particularly to the drawings, the numeral 1 designates the base which is constructed of sheet metal or the like and has secured to its peripheral edge at a relatively spaced distance apart the supporting plates 2, which supporting plates are arranged in pairs constituting inner and outer plates 2 and 3, the lower ends of the outer plates 2 have their ends bent angularly as at 4 and secured to the under side of the base as clearly shown in Fig. 5 of the drawings. The lower ends of the inner plates 3 have their ends also bent angularly and secured to the inner face of the base 1 as at 5 and clearly shown in Fig. 5 of the drawings. The peripheral edge of the base 1 which is located between the inner and outer plates 2 and 3 is bent upwardly in a vertical plane and is secured between the opposing faces of the inner and outer plates as at 6, thus providing a rigid structure.

The opposite side longitudinal edges of the plates 2 are bent inwardly as at 7 to lie against the faces of the inner plates 3. The extreme ends of the opposite side longitudinal edges of the plates 2 are bent back upon themselves to provide retaining flanges 8 as clearly shown in Fig. 5 of the drawings, the purpose of which will be hereinafter more fully described. The upper face of the base is provided with an annular flange 9 which is arranged concentrically therewith and constitutes a bait retaining member which permits the bait to be placed upon the face of the base and prevented from being spread or carried over the whole surface of the base.

A supporting ring 10 having its inner peripheral edge bent upwardly to provide an annular retaining flange 11 as is clearly shown in Fig. 5 of the drawings. The retaining ring 10 is constructed of flat sheet metal and is arranged in a horizontal plane and has its outer peripheral edge bent downwardly as at 12 to provide a retaining member which is located between the opposing faces of the inner and outer plates 2 and 3. The upper ends of the connecting or supporting plates 2 and 3 are bent angularly as at 13 and are secured to the outer and inner faces of the supporting ring 10 as clearly shown in Fig. 5 of the drawings and thus providing a rigid structure. The connecting plates 2 and 3 support the ring 10 at a relatively spaced distance from the base 1 as clearly shown in the drawings.

A plurality of cones 14 constructed of reticulated material are arranged in the openings defined by the spacing of the connecting plates 2 around the peripheral edge of the base and the supporting ring. The cones have their apexes open and are directed toward the center of the base plate 1 and are located over the flange 9 of the base 1 as clearly shown in Fig. 2 of the drawings. The outer enlarged ends of the cones are secured to the supporting ring 10 and base 1 by the bending back of the peripheral edges of the base 1 and supporting ring 10 firmly clamping the reticulated material of the cones therebetween, portions of the enlarged ends of the cones also secured under the retaining member 8 formed by the opposite side longitudinal edges of the outer plates 2 as clearly shown in Fig. 5 of the drawings.

The peripheral edge of the supporting ring 10 is located between the space defined by the connecting plates 2 and 3 and bent back upon itself as at 15 to define the retaining flanges which retains a portion of the enlarged ends of the cones 14 thereunder as clearly shown in Fig. 8 of the drawings. It can thus be seen that the bases of the cones or enlarged ends are rigidly supported by the connecting plates 2 and 3 by the peripheral edges of the base 1 and supporting ring 10.

Arranged around the flange 11 and upon the outer face of the ring 10, is the supporting ring 16. The supporting ring 16 has its inner peripheral edge bent upwardly at at 17 to provide an annular retaining flange around which is positioned the locking ring 18 which coöperates with the flange 17 of the ring 16 for securing the foraminous body 19 of the top member 20 therein. The lower edge of the foraminous or reticulated body 19 of the top member 20 is secured between the locking ring 18 and the retaining flange 17 of the ring 16 as is clearly shown in Fig. 2 of the drawings.

The reticulated body 19 tapers upwardly from the ring 16 and is secured to a cover 21, which cover is constructed of sheet metal and has a depending peripheral flange 22 which surrounds the upper open end of the reticulated body 19. A plurality of relatively spaced flat reinforcing bars 23 have their lower ends connected to the ring 16 at a spaced distance apart and are arranged on the exterior of the body 19. The upper ends of the reinforcing bars 23 are provided with a pair of relatively spaced slits 24 which defines a tongue 25 and fingers 26. The fingers 26 defined by the tongue 25 are bent inwardly under the peripheral flange 22 of the cover 21. One of the fingers of each of the reinforcing rods 23 is secured to the under side of the cover 21, while the opposite finger 26 is bent downwardly against the inner side of the reticulated body 19 thus securely holding the body against the inner faces of the reinforcing members 23. The tongues 25 have their ends bent inwardly as at 27 against the outer face of the cover 21 as clearly shown in Fig. 4 of the drawings. The fingers 26 of each of the members 23 securely hold the body 19 against movement and also rigidly supports the cover in spaced relation to the ring 16. A pair of the reinforcing rods 23 have one of their side longitudinal edges bent back against the outer face of the rods 23 to provide flanges 28, the purpose of which will be hereinafter more fully described. The opposed inner side longitudinal edges of the members 23 having the retaining flanges 28 are bent rearwardly against themselves as at 29 to provide retaining flanges which serve to hold the edges of the reticulated body 19 which is cut-away to form a door opening as clearly shown in Fig. 3 of the drawings.

The reinforcing ring 30 is arranged around the body 19 and is secured to the outer faces of the reinforcing bars 23 intermediate their ends as clearly shown in Fig. 2 of the drawings. The portion of the ring 30 which is located between the reinforcing bars having the retaining flanges has its upper peripheral edge bent back upon itself as at 31 to secure the edge of the reticulated body cut-away to form the opening.

A door member 32 formed of sheet metal and curved transversely and longitudinally at its upper edge is bent back upon itself as at 33 and has its opposite side longitudinal edges arranged under the retaining flanges 28 of the bars 23 and closing the opening in the upper member 20.

A pair of substantially U-shaped members 34 are secured to the outer face of the top 21 at diametrically opposite points near the peripheral edge thereof and are adapted to rotatably secure the handle and securing member 35 thereunder, as will be hereinafter more fully described.

The handle member above referred to comprises the U-shaped portion 36 having the ends of its arms bent laterally in opposite directions as at 37 and the laterally extending portions 37 are rotatably journaled under the straps 34 of the top 21. The extreme outer ends of the members 37 extend downwardly and inclined outwardly to provide spring arms 38, the lower ends of the arms 38 are directed inwardly as at 39 are adapted to be arranged under the horizontal portions of the retaining ring 10 for securely holding the top member 20 upon the base 1. The webs of the handle 35 permit the traps to be carried to its destination and placed in position for use. The top member 20 has located therein a cone 40 the base of which is inclined outwardly as at 41 and is bent downwardly to provide a retaining flange 42 which is positioned between the flange of the ring 16 and the locking ring 18 for securely positioning the apex of the cone 40 in direct alinement with the longitudinal axis of the cover 21 it being understood that the apex of the cone 40 is fully open as at 43 to permit insects crawling into the cones 14 to travel upwardly and thus drop down upon the inclined portion 41.

What is claimed is:

1. In a device of the character described, a lower member provided at its upper end with a reinforcing ring having a vertically disposed flange and a horizontally disposed flange, an upper member provided at its lower end with a reinforcing ring adapted to fit snugly about the vertical flange of the ring carried by the lower member, a handle member rockably mounted on the top of said upper member and disposed diametrically thereof, and depending arms carried by said handle at each end thereof and extending the full length of the top member at opposite sides of the same, said arms being provided at their lower ends with inturned portions adapted to engage beneath the horizontal flange of the ring carried by the lower member for detachably securing both of said members together.

2. In a device of the character described, a lower member provided with an outer annular projection, an upper member adapted to fit upon said lower member, a handle member rockably mounted upon the top of the upper member diametrically thereof for transporting the same, and downwardly diverging depending arms carried by said handle at each end thereof and provided at their lower ends with inturned members adapted for engagement beneath the annular projection of the lower member of the device for securing said lower member to said upper member.

In testimony whereof I affix my signature in presence of two witnesses.

ANDREW J. HARDIN.

Witnesses:
H. H. SPEAR,
A. J. GHOLSON.

Copies of this patent may be obtained for five cents each, by addressing the "Commissioner of Patents, Washington, D. C."